United States Patent
Wien et al.

(10) Patent No.: US 6,499,346 B1
(45) Date of Patent: *Dec. 31, 2002

(54) FILLING LEVEL MEASURING DEVICE OPERATING WITH MICROWAVES

(75) Inventors: Andreas Wien, Kamp-Lintfort (DE); Klaus-Peter Oberle, Weilheim (DE); Alexander Hardell, Lorrach (DE); Stefan Burger, Freiburg (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/724,132

(22) Filed: Nov. 28, 2000

Related U.S. Application Data

(63) Continuation of application No. 09/273,172, filed on Mar. 19, 1999, now Pat. No. 6,202,485.

(30) Foreign Application Priority Data

Mar. 28, 1998 (EP) .......................... 98105690

(51) Int. Cl.⁷ .................... G01D 21/00; G01F 23/22; H01P 1/16; G01R 427/04
(52) U.S. Cl. ................. 73/290 R; 324/642; 324/644; 333/251
(58) Field of Search .............. 73/290 R; 324/637, 324/642, 643, 644; 333/251, 252

(56) References Cited

U.S. PATENT DOCUMENTS

| | | | |
|---|---|---|---|
| 3,128,467 A | | 4/1964 | Lanctot ................ 343/708 |
| 3,400,404 A | * | 9/1968 | Kreutel, Jr. ............ 333/251 |
| 3,516,032 A | * | 6/1970 | Wernli ................ 333/251 |
| 3,525,934 A | * | 8/1970 | Prine et al. ............ 324/637 |
| 3,720,890 A | * | 3/1973 | Anderson ............ 324/643 |
| 4,641,139 A | * | 2/1987 | Edvarsson ............ 73/290 R |
| 4,802,234 A | * | 1/1989 | Tatomir et al. ........ 333/251 |
| 4,926,145 A | * | 5/1990 | Flam et al. ............ 333/251 |
| 5,032,811 A | | 7/1991 | Nishikawa et al. ...... 333/208 |
| 5,105,157 A | * | 4/1992 | Schmitt ................ 324/644 |
| H1244 H | * | 10/1993 | Evans ................ 333/251 |
| 5,438,867 A | | 8/1995 | Van Der Pol .......... 73/290 V |
| 5,543,720 A | | 8/1996 | Edvardsson ............ 324/643 |
| 5,642,131 A | | 6/1997 | Martek et al. .......... 343/786 |
| 5,652,522 A | * | 7/1997 | Kates et al. ............ 324/644 |
| 5,689,265 A | | 11/1997 | Otto et al. ............ 340/612 |
| 5,734,303 A | | 3/1998 | Baca ................ 333/21 R |
| 5,880,698 A | | 3/1999 | Burger | |
| 5,907,309 A | | 5/1999 | Anderson et al. ....... 343/786 |
| 5,926,080 A | | 7/1999 | Palan et al. .......... 73/290 R |

FOREIGN PATENT DOCUMENTS

| | | |
|---|---|---|
| DE | G 93 12 251.9 | 1/1994 |
| DE | G 94 12 243.1 | 11/1994 |
| EP | 0 101 219 | 7/1983 |
| EP | 821 431 | 6/1997 |
| GB | 2223360 A * | 4/1990 |
| JP | 05235604 A * | 9/1993 ............ 333/251 |
| WO | WO 95/29518 | 11/1995 |

OTHER PUBLICATIONS

Seeger, John A. "Microwave Theory, Components, and Devices", Prentice–Hall, New Jersey, 1986; pp 48 and 65–67.

* cited by examiner

*Primary Examiner*—Daniel S. Larkin
*Assistant Examiner*—Michael Cygan
(74) *Attorney, Agent, or Firm*—Bose McKinney & Evans LLP

(57) ABSTRACT

This level measuring instrument which operates with microwaves, has a radiation characteristic with a pronounced forward lobe and can be used to transmit and/or receive microwaves with a large frequency bandwidth. A housing section is designed as a waveguide short-circuited at one side and one end by a rear wall, and is virtually completely filled with an insert made of a dielectric. An exciter element, projects into the housing section and is connected to a microwave source. An antenna adjoins the housing section, for transmitting and/or receiving microwaves. A gap is arranged in the insert between the exciter element and the antenna. The gap forms a filter which is essentially non-transparent to higher modes of the waveguide.

24 Claims, 3 Drawing Sheets

FILLING LEVEL MEASURING DEVICE OPERATING WITH MICROWAVES

This is a continuation of application Ser. No. 09/273,172 filed Mar. 19, 1999 now U.S. Pat. No. 6,202,485.

FIELD OF THE INVENTION

The invention relates to a level measuring instrument which operates with microwaves, having a housing section which is designed as a waveguide short-circuited at one side and one end by a rear wall and which is virtually completely filled with an insert made of a dielectric, having an exciter element which projects into the housing section and which is connected to a microwave source, and having an antenna, adjoining the housing section, for transmitting and/or receiving microwaves.

BACKGROUND OF THE INVENTION

In level measurement, microwaves are transmitted by means of the antenna toward a surface of a filling material, and the echo waves reflected at the surface are received. An echo function which represents the echo amplitudes as a function of the distance is formed, and from this the probable useful echo and its transit time are determined. The distance between the filling material surface and the antenna is determined from the transit time.

It is possible to use all the known methods which permit relatively short distances to be measured by means of reflected microwaves. The best known examples are pulsed radar and frequency modulated continuous wave radar (FMCW radar).

In the case of pulsed radar, short microwave transmitted pulses, referred to below as wave packets, are transmitted periodically, are reflected from the filling material surface and, after a transit time which depends on distance, are received again. The received signal amplitude as a function of time constitutes the echo function. Each value in this echo function corresponds to the amplitude of an echo reflected at a specific distance from the antenna.

In the FMCW method, a continuous microwave is transmitted and is periodically linearly frequency modulated, for example in accordance with a sawtooth function. The frequency of the received echo signal therefore has a frequency difference with respect to the instantaneous frequency of the transmitted signal at the instant of reception, and this frequency difference depends on the transit time of the echo signal. The frequency difference between the transmitted signal and received signal, which can be obtained by mixing the two signals and evaluating the Fourier spectrum of the mixed signal, thus corresponds to the distance of the reflecting surface from the antenna. In addition, the amplitudes of the spectral lines of the frequency spectrum which is obtained by Fourier transformation correspond to the echo amplitudes. This Fourier spectrum therefore constitutes the echo function in this case.

Level measuring instruments which operate with microwaves are used in very many branches of industry, for example in the chemical industry or in the foodstuffs industry. Typically, the level in a container is to be measured. These containers usually have an opening on which a connecting piece or a flange is provided for fastening measuring instruments.

In industrial measurement, dielectric rod antennas and horn antennas are regularly used for transmitting and/or receiving. Typically, use is made of a housing having a housing section which has the geometry of a short-circuited waveguide. Inserted into this housing is an exciter element, via which microwaves can be transmitted and/or received through the housing section. In the case of a horn antenna, a funnel-like section which broadens in the direction of the container and forms the horn adjoins the housing. In the case of the rod antenna, a rod made of a dielectric and pointing into the container is provided.

The interior of the housing is usually virtually completely filled by an insert made of a dielectric. In the case of the horn antenna, the insert has a conical end pointing into the container. In the case of rod antennas, the rod-like antenna adjoins the insert.

In coaxial lines, electromagnetic waves are propagated without dispersion in the transverse electromagnetic mode (TEM mode). This field mode is therefore particularly well suited to transporting wave packets or electromagnetic waves which have a frequency spectrum with a finite but often very great bandwidth. The advantage of dispersion-free propagation is particularly important when the waves or wave packets to be transmitted have the above mentioned frequency bandwidth. Wave packets which are fed in then experience virtually no spreading and, in the case of linearly frequency modulated microwaves, any deviation from linearity is largely avoided.

However, those modes which exhibit a radiation characteristic with a pronounced forward lobe are better suited to the directed transmission of electromagnetic waves by means of an antenna. This property is exhibited, for example, by the fundamental mode, the transverse electric 11 mode (TE-11), which is capable of propagation in circular waveguides. The required mode conversion, for example from the TEM mode into the TE-11 mode, takes place as a result of the injection into the short-circuited waveguide by means of the exciter element.

DE-U 94 12 243 describes a level measuring instrument which operates with microwaves, having
   a housing section,
      which is designed as a waveguide short-circuited at one side and one end by a rear wall,
      which is virtually completely filled with an insert made of a dielectric,
   an exciter element,
      which projects into the housing section and
      which is connected to a microwave source, and
   an antenna, adjoining the housing section, for transmitting and/or receiving microwaves.

Here, the exciter element is a transmitting pin which is inserted laterally into the waveguide. In such an asymmetric arrangement, higher modes are excited in a circular waveguide in addition to the desired fundamental TE-11 mode.

EP-A 821 431 likewise describes a level measuring instrument which operates with microwaves, having
   a housing section,
      which is designed as a waveguide short-circuited at one side and one end by a rear wall,
      which is virtually completely filled with an insert made of a dielectric,
   an exciter element,
      which projects into the housing section and
      which is connected to a microwave source, and
   an antenna, adjoining the housing section, for transmitting and/or receiving microwaves.

The exciter element described is a transmitter wire whose two ends are arranged on the rear wall of the section of the housing and which has three straight segments, one of which runs essentially parallel to the rear wall.

With regard to the desired modes, this form of injection represents a considerable improvement by comparison with the above described lateral injection, but here, too, a proportion, albeit a very small proportion, of higher modes is still generated. This becomes noticeable in the case of pulsed radar, in particular, if very short pulses are generated in that case. The shorter a pulse, the greater the bandwidth of the frequencies contained in it.

The formation of higher modes inevitably leads to the increased occurrence of dispersion effects in the waveguide. At a given frequency, dispersion is very much more pronounced in higher modes than in the fundamental mode.

Higher modes regularly have an unsuitable radiation characteristic and interfere with the directional characteristic of the antenna.

A further disadvantage is that the higher TM-01 mode, by comparison with the fundamental mode, exhibits a long ringing period or decay period. This leads, for example in the case of pulsed radar, to a transmitted pulse not having decayed until after a relatively long period. An echo which occurs in this period can then be detected only when its amplitude considerably exceeds the amplitude of the decaying transmitted pulse. This period predefines a minimum physical distance which must exist between the measuring instrument and the level to be measured. If the distance falls below this physical minimum, reliable measurement is no longer ensured. The minimum distance corresponds to half the path traced by electromagnetic waves during said period, and is usually referred to as the blocking distance.

SUMMARY OF THE INVENTION

It is therefore an object of the invention to specify a level measuring instrument which operates with microwaves, can be used in industrial measurement, has a radiation characteristic with a pronounced forward lobe and can be used to transmit and/or receive microwaves with a large frequency bandwidth.

To this end, the invention comprises a level measuring instrument which operates with microwaves, having a housing section,
  which is designed as a waveguide short-circuited at one side and one end by a rear wall,
  which is virtually completely filled with an insert made of a dielectric,
an exciter element,
  which projects into the housing section and
  which is connected to a microwave source,
an antenna, adjoining the housing section, for transmitting and/or receiving microwaves, and
a gap arranged in the insert between the exciter element and the antenna,
  which gap forms a filter which is essentially non-transparent to higher modes of the waveguide.

According to a first preferred embodiment of the invention, the gap runs parallel to a longitudinal axis of the housing section and has a length equal to an odd multiple of a quarter wavelength of a fundamental mode of the waveguide having the gap and the dielectric.

According to a second preferred embodiment, the gap runs perpendicular to the longitudinal axis of the housing section and has a width b such that a higher mode experiences virtually complete attenuation as it passes through the gap.

According to a third preferred embodiment, two gaps arranged one behind the other in the longitudinal direction are provided in the insert, between the exciter element and the antenna, one of these gaps running parallel to the longitudinal axis of the housing section, and one running perpendicular thereto.

According to a further preferred embodiment, the exciter element is a transmitter wire fastened to the rear wall.

According to a further preferred embodiment, the exciter element is arranged in a region of the gap which adjoins the rear wall.

One advantage of the invention is that no additional components are necessary. Level measuring instruments which are suitable for industrial applications regularly have an insert made of a dielectric which virtually completely fills the waveguide. This dielectric serves to protect the exciter element mechanically and prevents any penetration of dirt or any formation of condensation in the housing section.

Examples of suitable dielectrics are fluoropolymers, especially polytetrafluoroethylene (PTFE) or polyphenylene sulfide (PPS). These materials are very well suited to mechanical machining, so that a gap can be produced without great effort. If the gap is used at the same time to accommodate the exciter element, no additional operation is required. All that need be done is to lengthen or enlarge a recess provided to accommodate the exciter element.

BRIEF DESCRIPTION OF THE DRAWINGS

The invention and further advantages will now be explained in more detail using the figures of the drawing, which illustrate two exemplary embodiments of a level measuring instrument which operates with microwaves; identical parts are provided with identical reference symbols in the figures. In the drawing.

DETAILED DESCRIPTION OF THE DRAWINGS

Figure 1:
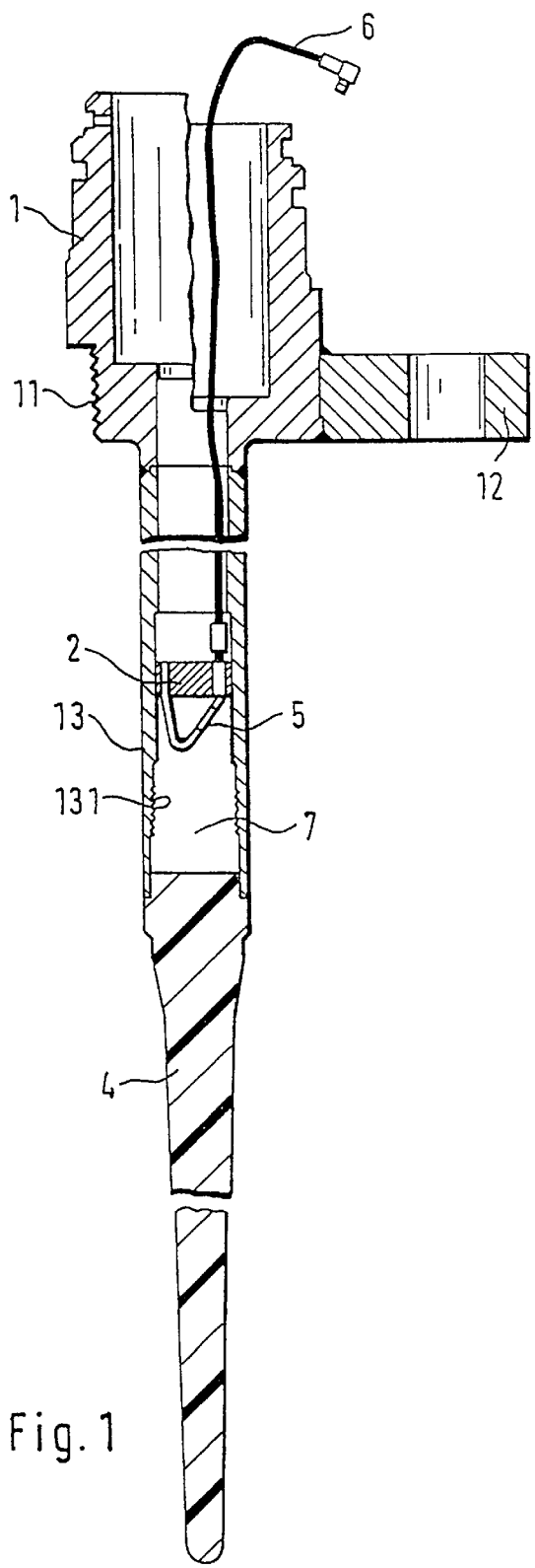
FIG. 1 shows a longitudinal section through a level measuring instrument which operates with microwaves and in which a gap runs parallel to the longitudinal axis of a housing section.

FIG. 1 shows a level measuring instrument which operates with microwaves. The instrument is intended to be fastened at a measurement location, for example on a container. To this end, it has a housing 1 with a fastening device. This is, for example as illustrated in the left-hand half of FIG. 1, an external thread 11, by means of which the instrument can be screwed into an appropriate opening in the container. The instrument can equally well be fastened at the measurement location by means of a flange 12. This is illustrated in the right-hand half of FIG. 1. Other types of fastening can likewise be used.

The housing 1 has a housing section 13 which is designed as a waveguide short-circuited at one side and one end by a rear wall 2. When said housing is installed, an opening in the housing section 13, said opening being remote from the rear wall 2, points into the container in the direction of a filling material whose level is to be measured. In the exemplary embodiment shown, the housing 1 is essentially cylindrical, and the housing section 13 constitutes a circular waveguide.

Figure 2:
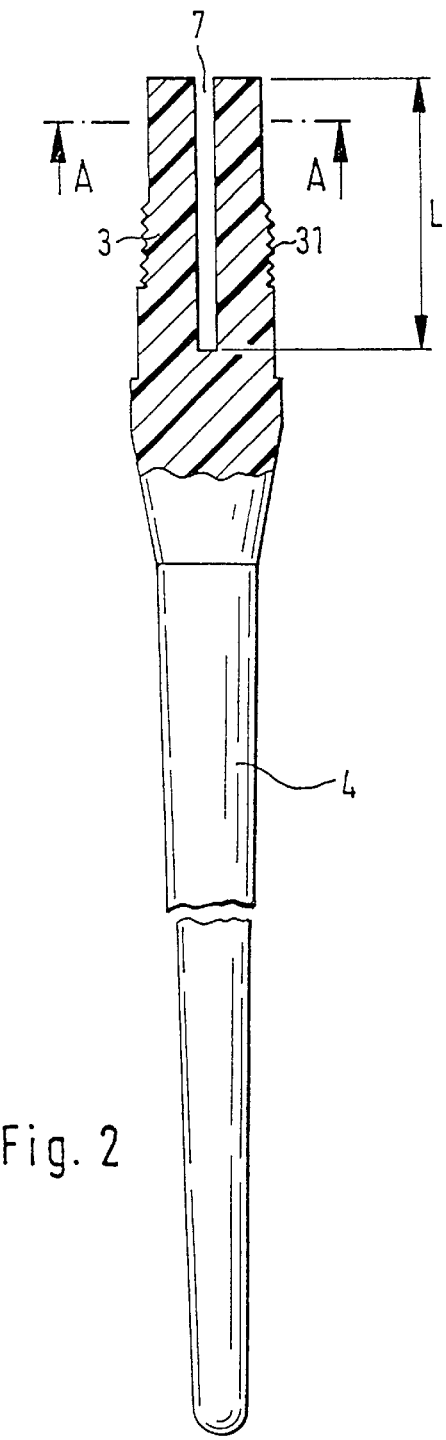
FIG. 2 shows a longitudinal section through the insert and the antenna of FIG. 1.

The housing section 13 is virtually completely filled with an insert 3 made of a dielectric. FIG. 2 shows a view of the insert 3. The material to be provided here is preferably a material which, on account of its chemical and mechanical resistance, is suitable for industrial applications, such as polyphenylene sulfide (PPS) or a fluoropolymer. A fluoropolymer is to be understood as a fluorine-containing polymer, that is to say a polymer with a high proportion of fluorine. The fluoropolymer is preferably polytetrafluoroethylene (PTFE). Also very suitable are modifications of polytetrafluoroethylene (PTFE) in which polytetrafluoroethylene (PTFE) is used as the basic substance. Examples of this are tetrafluoroethylene hexafluoropropylene copolymer (FEP) and perfluoroalkoxy copolymer (PFA).

The housing section 13 is adjoined by an antenna 4 for transmitting and/or receiving microwaves. In the exemplary embodiments, this is a rod antenna made of a dielectric which, when it is installed, points into the container in the direction of the level to be measured. Other forms of antenna, for example the horn antennas described at the beginning, can also be used. As can be seen from FIG. 2, the insert 3 and the antenna 4 are a single, essentially cylindrical component. The insert 3 has an external thread 31 by means of which it can be screwed into an internal thread 131 arranged in the housing section 13.

An exciter element 5 is provided, which projects into the housing section 13 and which is connected via a coaxial line 6 to a microwave source (not illustrated in the figure). The microwave source is, for example, a pulsed radar instrument, an FMCW instrument or a continuously oscillating microwave oscillator.

The exciter element 5 is a transmitter wire fastened to the rear wall 2 of the housing section 13. An exciter element of this type is described in DE-A 196 29 593.

The transmitter wire comprises a conductive metal, for example one made of brass, copper, silver or aluminum. A first end of the transmitter wire is electrically conductively connected to the inner conductor of the coaxial line 6. An insulated bushing is provided for this purpose in the rear wall 2. An outer conductor of the coaxial line 6 is electrically conductively connected to the rear wall 2. The second end of the transmitter wire is electrically conductively connected to the rear wall 2. The transmitter wire has three regions, a straight section running at a distance from the rear wall 2 of the antenna 4, and two legs adjoining said section and leading from the section to the ends. In order to generate the desired fundamental mode TE-11, the average distance between the section of the transmitter wire and the rear wall 2 has to be selected such that it is equal to a quarter of the waveguide wavelength $\lambda_H$ of the TE-11 mode in the circular waveguide.

In order to determine this waveguide wavelength $\lambda_H$, it is necessary to use a relevant frequency of the microwaves to be transmitted. In the case of using a pulsed radar instrument, the relevant frequency is equal to a center frequency of a frequency spectrum of the transmitted pulse and, in the case of using a linearly frequency modulated FMCW instrument, the relevant frequency is equal to its center frequency.

In the case of this exciter element 5, it is possible to allow a frequency range for the microwaves which is greater than the frequency range in which, given the predefined dimensions, only the TE-11 mode is capable of propagation, without the next higher TM-01 mode being generated and transmitted.

However, higher modes cannot be suppressed completely even in the case of this type of microwave injection, in particular when the frequencies of the microwaves have a very great bandwidth.

According to the invention, a gap 7 is therefore arranged in the insert 3 between the exciter element 5 and the antenna 4, and forms a filter which is non-transparent to higher modes of the waveguide. As can be seen from FIG. 2, the gap 7 runs parallel to a longitudinal axis of the housing section 13 and adjoins the rear wall 2. The exciter element 5 is arranged in a region of the gap 7 which adjoins the rear wall. Said exciter element is fastened to the rear wall 2 in such a way that it projects into the gap 7.

Figure 3:
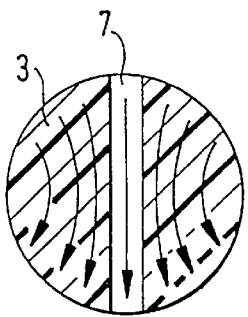
FIG. 3 shows a section through the insert of FIG. 1 and the course of the electric field lines of the fundamental mode TE-11 in the section plane.
Figure 4:
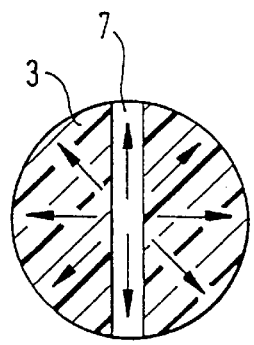
FIG. 4 shows a section through the insert of FIG. 1 and the course of the electric field lines of the next higher mode TM-01 in the section plane.

FIGS. 3 and 4 each show a section through the insert 3. The section plane is identified by A in FIG. 2. In this illustration, the gap 7 runs diagonally through the center of the circular section face of the insert 3.

FIG. 3 illustrates the electric field lines of the fundamental mode TE-11; FIG. 4 illustrates those of the next higher mode TM-01. The electric field lines of the fundamental mode TE-11 run essentially parallel to the gap 7 in the section plane in the gap 7, while the electric field lines of the next higher mode TM-01 point radially outward from the center. The different orientation of the field lines in relation to the gap 7 has the effect that the insert 3 has different effective dielectric constants for the two modes. As a result, the spacing between the cut-off frequencies of the two modes is increased. In a corresponding way, the frequency range in which only the desired fundamental mode TE-11 is capable of propagation is considerably enlarged. Below the cut-off frequency for the higher mode, which is shifted to a higher frequency value by the gap 7, this higher mode is extremely highly attenuated and is not capable of propagation.

Simulation calculations and model experiments have shown that the filter function is particularly pronounced if the gap 7 has a length L equal to an odd multiple of a quarter wavelength of the fundamental mode, TE-11, of the waveguide having the insert 3 with the gap 7. The transition from the slotted waveguide to the waveguide which is completely filled with a dielectric is then particularly beneficial for the fundamental mode.

It is therefore possible to improve the radiation characteristic of the level measuring instrument considerably without any additional components being required and/or without any additional work arising during production. This is achieved by a recess which has to be provided in any case to accommodate the exciter element 5 being designed in the gap form described.

The ringing period or decay period is also considerably reduced by comparison with a level measuring instrument without an appropriate gap 7. The reason for this is that the proportion of microwaves in the TM-01 mode at frequencies close to the cut-off frequency of this mode is very much lower, because of the shifting of the cut-off frequency to a higher frequency value. It is precisely this proportion which leads to long decay periods in conventional level measuring instruments.

Figure 5:
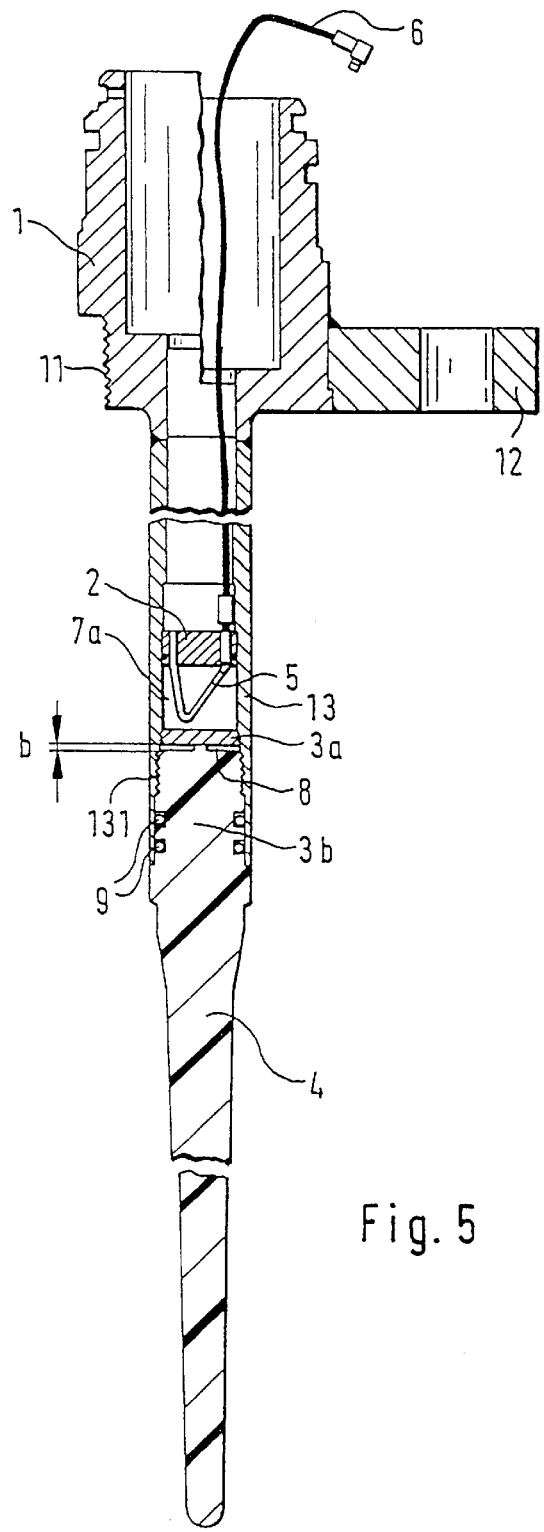
FIG. 5 shows a longitudinal section through a level measuring instrument which operates with microwaves and in which a gap runs perpendicular to the longitudinal axis of a housing section.

FIG. 5 shows a further exemplary embodiment of a level measuring instrument which operates with microwaves. In the text which follows, only the differences from the exemplary embodiment illustrated in FIG. 1 will be explained in more detail. The essential difference is that a two-part insert is used, comprising a first element 3a and a second element 3b. Arranged between the first and the second element 3a, 3b is a gap 8, which runs perpendicular to the longitudinal axis of the housing section 13 and has a width b such that a higher mode experiences virtually complete attenuation as it passes through the gap 8. In this case, use is made of the effect whereby higher modes, as they pass through the gap 8 in the propagation direction, experience higher attenuation than the fundamental mode.

In the gap 8, the cut-off frequencies of the waveguide for the fundamental mode and for the next higher mode have higher values than in the dielectric. The magnitude of the difference between the two cut-off frequencies of the higher mode is referred to below as the frequency shift $\Delta v$. Accordingly, a proportion of the microwaves having frequencies which, in the dielectric, lie above the cut-off frequency of the higher mode and below the sum of the cut-off frequency of the higher mode and of the frequency shift $\Delta v$ is below the cut-off frequency of the higher mode in the gap 8, and is therefore very highly attenuated. The width b which is optimal for the respective application can be determined either experimentally by varying the distance between the first and the second element 3a, 3b or by means of appropriate simulation calculations.

For microwave pulses having a center frequency of about 6 GHz and a housing section 13 filled with polyphenylene sulfide (PPS) and having an internal diameter of about 20 mm, the gap 8 preferably has a width of about 1 mm.

Figure 6:
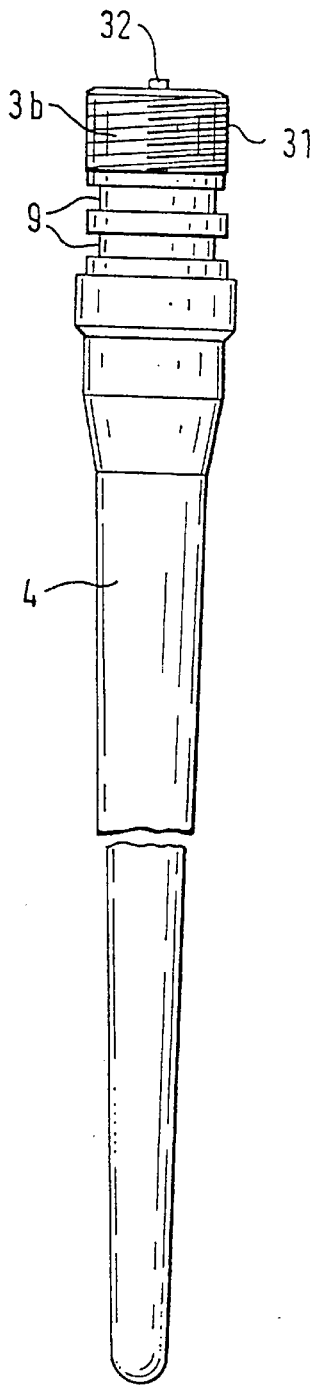
FIG. 6 shows the antenna and an element of the insert of FIG. 5.
Figure 7:
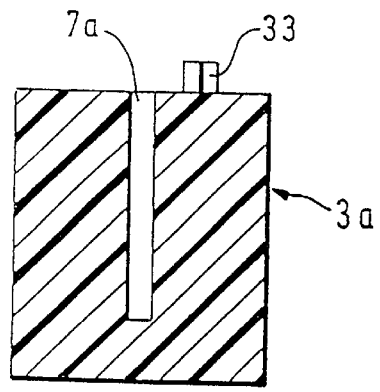
FIG. 7 shows a longitudinal section through the first element of FIG. 5.
Figure 8:
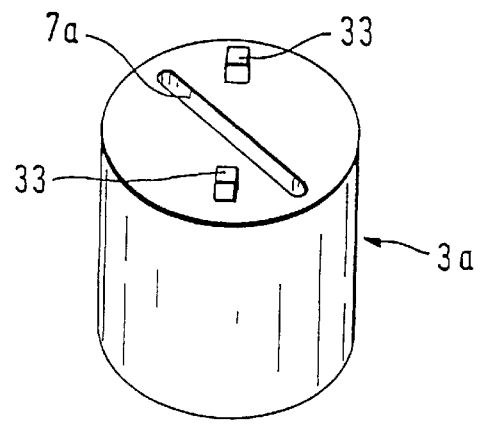
FIG. 8 shows a view of the first element of FIG. 5.

The second element 3b and the antenna 4 are a single-piece component. FIG. 6 illustrates a view of this. FIGS. 7 and 8 show a longitudinal section and a view of the first element 3a.

The first element 3a is cylindrical and, on its end face facing the rear wall, has two projecting latching tabs 31. In the installed state, these tabs are arranged in corresponding recesses in the rear wall 2 and prevent any rotation of the first element 3a. This measure serves to protect the exciter element 5. An end face of the first element 3a which faces away from the rear wall is flat.

Molded onto the second element 3b is an external thread 31, by means of which the second element 3b and the antenna 4 can be screwed into the housing section 13. Molded onto that end face of the second element 3b which faces the first element 3a, in the center, is a cylindrical spacer 32. The height of this spacer 32 is equal to the width b of the gap 8.

Below the external thread 31, the second element 3b has two annularly circumferential grooves 9 to accommodate seals, for example O-rings. Grooves and seals can, of course, also be provided in the exemplary embodiment illustrated in FIG. 1.

In addition to the gap 8, which runs perpendicular to the longitudinal axis of the housing section 13, the exemplary embodiment illustrated in FIG. 5 has a gap 7a which runs parallel to the longitudinal axis of the housing section 13. The gap 7a, exactly like the gap 7 in the exemplary embodiment of FIG. 1, directly adjoins the rear wall 2 and serves to accommodate the exciter element 5. The two gaps 7a and 8 are therefore arranged one behind the other in the longitudinal direction between the exciter element 5 and the antenna 4 in the housing section 13.

Of course, the gap 7a may also have a greater length, corresponding to the gap 7 illustrated in FIG. 1, and may likewise be designed as a filter for higher modes. Such a level measuring instrument would have two gaps arranged one behind the other in the longitudinal direction and serving as filters for higher modes.

What is claimed is:

1. A level measuring instrument, comprising
   an exciter element that excites microwaves;
   an antenna that transmits microwaves received from the exciter element;
   a waveguide between the exciter element and the antenna that guides microwaves between the exciter element and the antenna, the waveguide defining a longitudinal axis between the exciter element and the antenna; and
   a dielectric insert positioned in the waveguide between the exciter element and the antenna, the dielectric insert comprising dielectric material and a longitudinal gap in the dielectric material of the dielectric insert that lies along the longitudinal axis, the longitudinal gap sized to pass to the antenna a fundamental mode portion of the microwaves received from the exciter element, and filter from the antenna a higher mode portion of the microwaves received from the exciter element.

2. The level measuring instrument of claim 1, wherein the longitudinal gap has a length equal to an odd multiple of a quarter wavelength of the fundamental mode portion of the microwaves.

3. The level measuring instrument of claim 1, wherein the dielectric insert further comprises
   a latitudinal gap that intersects the longitudinal axis of the waveguide, the latitudinal gap sized to attenuate the higher mode portion of the microwaves received from the exciter element.

4. The level measuring instrument of claim 3, wherein the latitudinal gap is between the longitudinal gap and the antenna.

5. The level measuring instrument of claim 1, wherein the exciter element extends into the longitudinal gap.

6. The level measuring instrument of claim 1, wherein the waveguide comprises a rear wall that closes one end of the waveguide,
   the dielectric insert and the longitudinal gap abut the rear wall of the waveguide, and
   the exciter element is attached the rear wall and extends into the longitudinal gap of the dielectric insert.

7. The level measuring instrument of claim 1, wherein the dielectric insert comprises
   a first dielectric element in which is provided the longitudinal gap, and
   a second dielectric element that defines, between the longitudinal gap and the antenna, a latitudinal gap that intersects the longitudinal axis of the waveguide, the second dielectric element defining the latitudinal gap sized to attenuate the higher mode portion of the microwaves received from the exciter element.

8. The level measuring instrument of claim 7, wherein the second dielectric element comprises
   a spacer that defines a width for the latitudinal gap when the second element abuts the first element.

9. The level measuring instrument as claimed in claim 7, wherein the exciter element is a transmitter wire fastened to the rear wall.

10. The level measuring instrument as claimed in claim 9, wherein the exciter element is arranged in a region of the gap which adjoins the rear wall.

11. A level measuring-instrument, comprising:
    a housing designed as a waveguide;

an exciter element that projects into the housing and excites microwaves;

an antenna that adjoins the housing and transmits and receives microwaves from the exciter element;

a dielectric insert positioned in the housing; and a gap positioned in the dielectric insert between the exciter element and the antenna, that runs perpendicular to a longitudinal axis of the housing and has a width such that higher modes of the microwaves are substantially attenuated as they pass through the gap.

12. The level measuring instrument of claim 11, wherein the exciter element extends into the gap.

13. The level measuring instrument of claim 12, wherein the housing further comprises a rear wall that closes one end of the housing, the dielectric insert and the gap abut the rear wall of the housing, and the exciter element is attached to the rear wall.

14. The level measuring instrument as claimed in claim 11, wherein the exciter element is a transmitter wire.

15. The level measuring instrument of claim 11, wherein the dielectric insert comprises a first dielectric element in which is provided a longitudinal gap, and a second dielectric element that defines, between the longitudinal gap and the antenna, the gap.

16. The level measuring instrument of claim 15, wherein the second dielectric element further comprises a spacer that defines a width for the gap when the second element abuts the first element.

17. A level measuring instrument, comprising:

a housing substantially filled with an insert made of a dielectric, the dielectric insert including a first dielectric element and a second dielectric element;

an exciter element that projects into the housing and excites microwaves;

an antenna adjoining the housing that transmits and receives microwaves from the exciter element;

a first gap located in the housing between the exciter element and the antenna and positioned parallel to the longitudinal axis of the housing; and a second gap located in the housing between the exciter element and the antenna and positioned perpendicular to the longitudinal axis of the housing, the second gap being defined between the first and second dielectric elements.

18. The level measuring instrument of claim 17, wherein the first and second gaps are positioned one behind the other between the exciter element and the antenna.

19. The level measuring instrument of claim 17, wherein the second gap is positioned between the first gap and the antenna.

20. The level measuring instrument of claim 17, wherein the second dielectric element further comprises a spacer that defines a width for the second gap when the second element abuts the first element.

21. The level measuring instrument of claim 17, wherein the first gap is sized to attenuate higher mode portions of the microwaves received from the exciter element.

22. The level measuring instrument of claim 17, wherein the first gap has a length equal to an odd multiple of a quarter wavelength of the fundamental mode portion of the microwaves.

23. The level measuring instrument as claimed in claim 17, wherein the exciter element is a transmitter wire.

24. The level measuring instrument as claimed in claim 17, wherein the housing further comprises a rear wall that closes one end of the housing and the exciter element is arranged in a region which adjoins the rear wall.

* * * * *

UNITED STATES PATENT AND TRADEMARK OFFICE
CERTIFICATE OF CORRECTION

PATENT NO. : 6,499,346 B1
DATED : December 31, 2002
INVENTOR(S) : Andreas Wien et al.

It is certified that error appears in the above-identified patent and that said Letters Patent is hereby corrected as shown below:

<u>Title page,</u>
Item [56], please correct the cited U.S. PATENT DOCUMENT No. "5,642,131" to read as follows:
-- 5,642,121  A   6/1997   Martek et al. ................... 343/786 --

Signed and Sealed this

Twenty-ninth Day of April, 2003

JAMES E. ROGAN
*Director of the United States Patent and Trademark Office*